United States Patent [19]
Foote

[11] Patent Number: 5,952,575
[45] Date of Patent: Sep. 14, 1999

[54] FORCE REBALANCE ACCELEROMETERS AND REBALANCING METHODS

[75] Inventor: Steven A. Foote, Issaquah, Wash.

[73] Assignee: AlliedSignal Inc., Morristown, N.J.

[21] Appl. No.: 08/904,059

[22] Filed: Jul. 31, 1997

Related U.S. Application Data

[60] Provisional application No. 60/044,241, Apr. 11, 1997.

[51] Int. Cl.$^6$ ..................................................... G01P 15/13
[52] U.S. Cl. ...................................... 73/514.21; 73/514.23
[58] Field of Search ........................... 73/514.17, 514.21, 73/514.22, 514.23, 514.24; 335/236

[56] References Cited

U.S. PATENT DOCUMENTS

| | | |
|---|---|---|
| 3,331,253 | 7/1967 | Morris . |
| 3,702,073 | 11/1972 | Jacobns .................................. 73/517 |
| 4,726,228 | 2/1988 | Norling ............................. 73/514.21 |

*Primary Examiner*—John E. Chapman

[57] ABSTRACT

A force rebalance accelerometer includes a magnetic assembly designed for improved scale factor performance and producibility. The magnetic assembly excitation ring includes slots. The slots are defined by an inner edge of the upper surface of the excitation ring and are separated by an upper surface portion or tongue intermediate the slots which extends away from the outer edge of the upper surface and toward a magnet received within the interior portion of the excitation ring.

28 Claims, 2 Drawing Sheets

FORCE REBALANCE ACCELEROMETERS AND REBALANCING METHODS

CROSS-REFERENCE TO RELATED APPLICATIONS

This application claims priority from a U.S. Provisional Application Ser. No. 60/044,241 filed Apr. 11, 1997, titled "Split Linearity Notch" listing as inventor Steven A. Foote, and incorporated herein by reference.

TECHNICAL FIELD

This invention relates generally to force rebalance accelerometers and to rebalancing methods.

BACKGROUND OF THE INVENTION

Force rebalance accelerometers which include one or more electromagnet assemblies for bringing about a so-called null position in response to an acceleration or force input are known. Exemplary accelerometers are disclosed in the following U.S. patents, all of which are incorporated herein by reference:

U.S. Pat. Nos. 4,182,187; 4,250,757; 4,394,405; 4,399,700; 4,400,979; 4,441,366; 4,555,944; 4,555,945; 4,592,234; 4,620,442; 4,697,455; 4,726,228; 4,932,258; 4,944,184; 5,024,089; 5,085,079; 5,090,243; 5,097,172; 5,111,694; 5,182,949; 5,203,210; 5,212,984; 5,220,831; 5,488,865; 5,557,044; 5,587,530; and 5,600,067.

An exemplary prior art force rebalance accelerometer is shown in FIG. 1 generally at 10. Accelerometer 10 includes one or more magnetic assemblies 12 and a proof mass assembly 14. The magnetic assemblies generally include a permanent magnet 16 for developing a magnetic flux, and an excitation ring or flux concentrator 18 which receives magnet 16 and directs the magnet flux as will become apparent below. The excitation ring is typically formed from a material having a relatively high permeability, such as Invar, to enable a magnetic return path to be formed for the magnet flux. In the illustrated example, excitation ring 18 is generally cylindrical in form and includes a base 20, an outer wall 22 joined with the base, and an upper surface 24. Upper surface 24 is defined between an outer edge 26 and an inner edge 28. The inner edge defines an opening 29 into an interior region inside of the excitation ring and within which magnet 16 is received. A plurality of electrical leads 30 are provided and extend from the outside world into the flux concentrator through openings (not specifically shown) formed therein. The openings, most often, are provided in the base of the flux concentrator and are filled with epoxy to fix the leads therewithin. The electrical leads operably connect with circuitry which enables the accelerometer to operate as described below. Exemplary outside world circuitry includes position detector circuitry for measuring electrical indicia of an acceleration-induced change in proof mass assembly 14, as will become apparent below. Exemplary position detector circuitry is disclosed in U.S. Pat. No. 4,634,965, which is incorporated herein by reference. Such outside world circuitry also enables electric current to be delivered to the proof mass assembly as will become apparent below. Electrical leads 30 also extend through a pair of apertures 32, 34 in upper surface 24 and operably connect with the proof mass through an electrical connection described below.

Turning attention to proof mass assembly 14, such includes a proof mass 36 having a pair of bobbins, one of which is shown at 38. Another bobbin is connected on the other side of proof mass 36 and is not specifically shown. Each bobbin supports electrically conductive structure in the form of torque coils 40 which are electrically connected with the outside world through electrical leads 30. Proof mass assembly 14 also includes a mounting ring 42 and a pair of flexures 44, 46 which provide a physical and electrical interconnection between proof mass 36, mounting ring 42, and electrical leads 30. Flexures 44, 46 define a hinge having a hinge axis about which proof mass 36 can rotate in response to an acceleration force. It is precisely this rotation or movement which is detected and acted upon by the outside world electrical circuitry and which enables calculation of an acceleration.

The nuances of the above-described accelerometer operation are described in great detail in many of the patents incorporated by reference above. In addition, the reader is referred to a text book entitled "Modern Inertial Technology, Navigation, Guidance and Control" by Anthony Lawrence and published by Springer-Verlag, the disclosure of which is expressly incorporated by reference herein. Briefly described below, however, are some operational characteristics which are helpful to understand the present invention.

The above-described accelerometer has three principal accelerometer axes which are of interest. The hinge axis A, mentioned above, defines an axis about which the proof mass can rotate in response to an acceleration. An input axis B defines a direction along which acceleration is desired to be measured. A pendulous axis C is also defined by the proof mass. The hinge (flexures 44, 46) supports proof mass 36 and desirably has a low rotational stiffness about hinge axis A, so that it does not restrain the proof mass or pendulum in its response to the acceleration it is supposed to sense. It is also desirable that the hinge have a high stiffness about input axis B and pendulous axis C so that it resists buckling, twisting, or bending in response to accelerations either along hinge axis A or pendulous axis C. Moreover, it is desirable that the hinge lie in the plane containing the proof mass center of gravity so that accelerations along the pendulous axis do not produce so-called cross-coupling errors. A cross-coupling error relates to an accelerometer's sensitivity to an acceleration along an axis other than the input axis. Such errors can be induced, for example, if the hinge is twisted or misaligned in its plane.

In operation, an acceleration force is experienced along input axis B which causes proof mass 36 to rotate about hinge axis A and toward one of magnet assemblies 12. Upper surfaces 24 of magnet assemblies 12 form, together with metallized portions of proof mass 36, a so-called capacitive pickoff. When the proof mass is centered between the two magnet assemblies, the two capacitances are equal. When an acceleration displaces the proof mass as mentioned above, the distance between the proof mass and the respective magnet assemblies changes, which in turn, causes one of the capacitances to increase while the other capacitance decreases. The capacitors are incorporated into circuitry which provides an output signal which is indicative of the displacement of the proof mass. The output signal is utilized in a servo system which generates an electrical current which passes into the torque coils by way of electrical leads 30. The current in the torque coils interacts with the magnetic field or flux from the magnet assemblies and generates a restoring force which restores the proof mass to its centered or null position between the magnet assemblies. The magnitude of the current necessary to return the proof mass to its null position gives an indication or measure of the acceleration experienced by the proof mass.

It is highly desirable to provide the restoring force at the effective center of mass of the proof mass for a number of reasons. Doing so avoids creating a rotation force on the hinge about an axis other than the hinge axis which, over a period of time or under high G-forces, can cause the hinge to deform. Additionally, collocating the restoring force with the proof mass effective center of mass reduces cross-coupling errors and non-linearity. Additionally, by not collocating the restoring force and the proof mass effective center of mass, a second degree of freedom is imparted to the proof mass which cannot adequately be servoed which, in turn, impacts the G range of the accelerometer.

Contributions to the proof mass's effective center of mass are made by not only proof mass 36 itself, but the area cut away to form flexures 44, 46 as well. The result of the flexures' contribution is that the effective center of mass is shifted or displaced from the center of the proof mass assembly 14, along the pendulous axis and away from the flexures. While either the restoring force or the proof mass center of mass can be moved to effectuate co-location of the same, it is generally easier to move the restoring force.

One practice in the past, with respect to relocating the restoring force, has been to provide a notch 48 (FIG. 1) in the excitation ring or flux concentrator. The provided notch is disposed between apertures 32, 34 through which electrical leads 30 extend. Notch 48 serves to redirect the magnetic flux produced by magnet 16 so that the restoring force is moved positively along the pendulous axis to coincide with the proof mass effective center of mass. Yet, a number of problems are presented by this approach. First, notch 48 creates a pair of thinned regions 50 in excitation ring 18. Because the magnetic flux avoids the gap defined by notch 48, it is redirected and concentrated toward the thinned regions 50. High concentration of magnetic flux in regions 50 can cause magnetic saturation effects which, in turn, degrade scale factor thermal hysteresis and generate long term drift errors. Needless to say, if the restoring force and the proof mass center of mass are not co-located, all of the problems discussed above come to bear on the accelerometer.

Additionally, manufacture of the accelerometer illustrated in FIG. 1 is necessarily complicated because access to the electrical leads is hindered by apertures 32, 34 and thinned regions 50. More specifically, the excitation ring structure essentially leaves the apertures (not specifically shown, but disposed in base 20) through which the electrical leads extend in a blind construction area. The electrical leads can be the source, after manufacture, of production failures thereby requiring re-work or re-potting with epoxy material. Because access to the leads is hindered by the existing excitation ring structure, such re-work is necessarily hindered and complicated.

This invention arose out of concerns associated with providing rebalancing accelerometer constructions and methods having improved scale factor performance, with better producibility and lower cost.

SUMMARY OF THE INVENTION

Force rebalance accelerometers and rebalancing methods are described. A force rebalance accelerometer includes a proof mass, a mounting ring, at least one flexure connected between the proof mass and the mounting ring, and a magnetic assembly operably adjacent the proof mass. According to one aspect of the present invention, the magnetic assembly includes an excitation ring or flux concentrator having an upper surface disposed between outer and inner edges. The inner edge defines an opening into an interior region inside of which a magnet is received. The opening has a top half and a bottom half and the inner edge defines a pair of spaced-apart slots in the top half of the upper surface. The slots are separated by a portion of the upper surface which extends away from the outer edge and toward an inner edge portion disposed across the opening. According to another aspect of the present invention, the flux concentrator includes an inner wall which circumscribes both the magnet and at least one electrical lead which extends into the interior region of the flux concentrator from the outside world.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
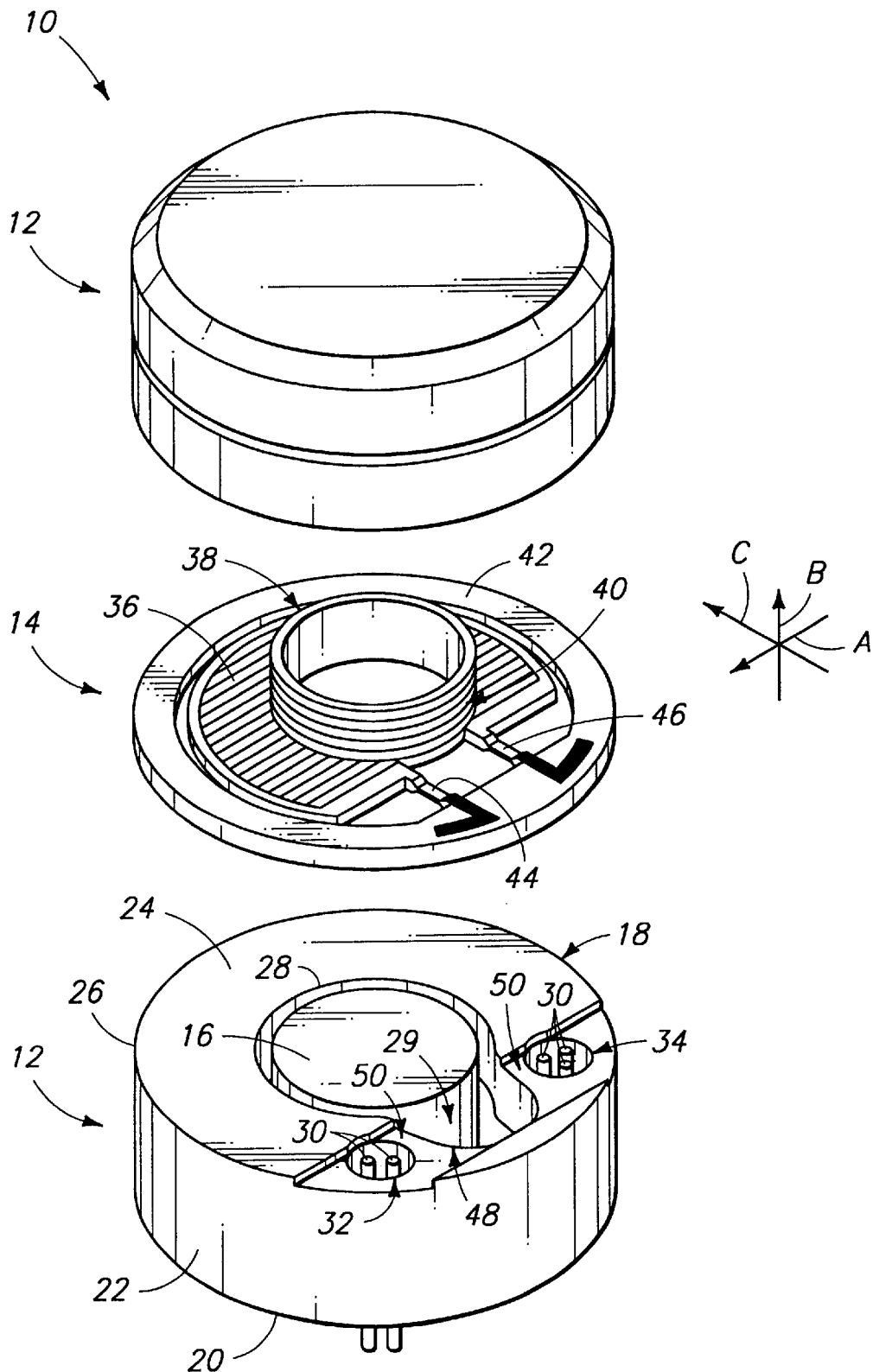
FIG. 1 is an exploded perspective view of a known force rebalance accelerometer.
Figure 2:
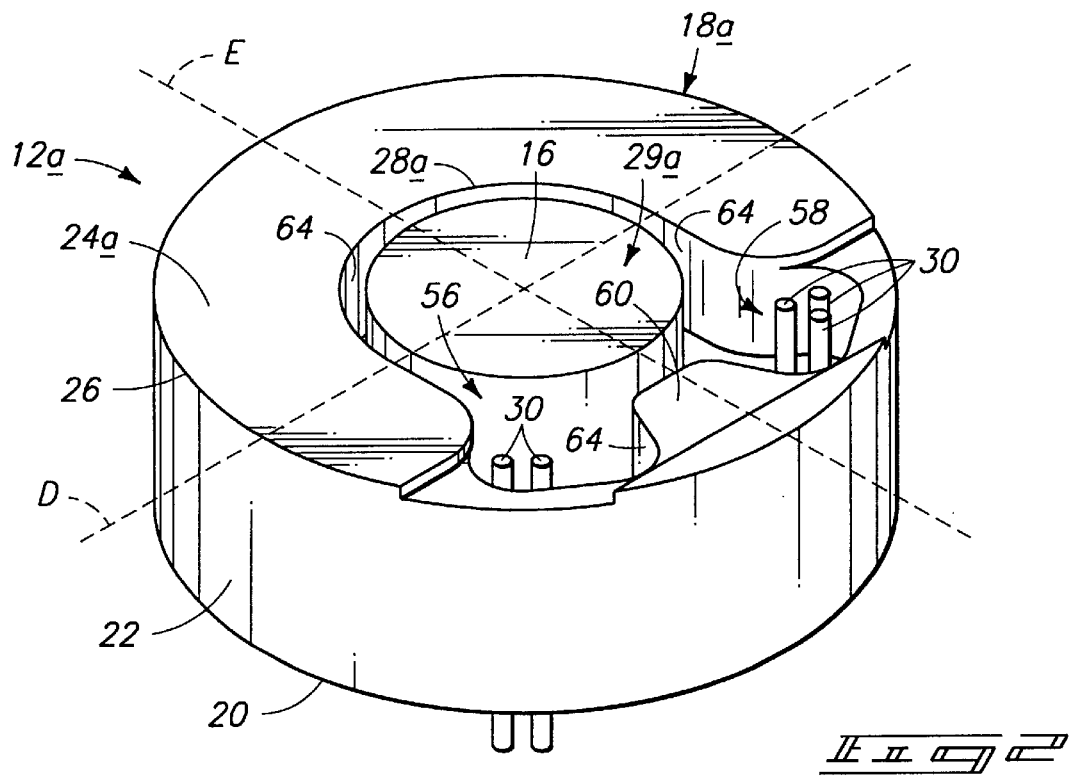
FIG. 2 is a perspective view of a magnetic assembly constructed in accordance with a preferred embodiment of the present invention.
Figure 3:
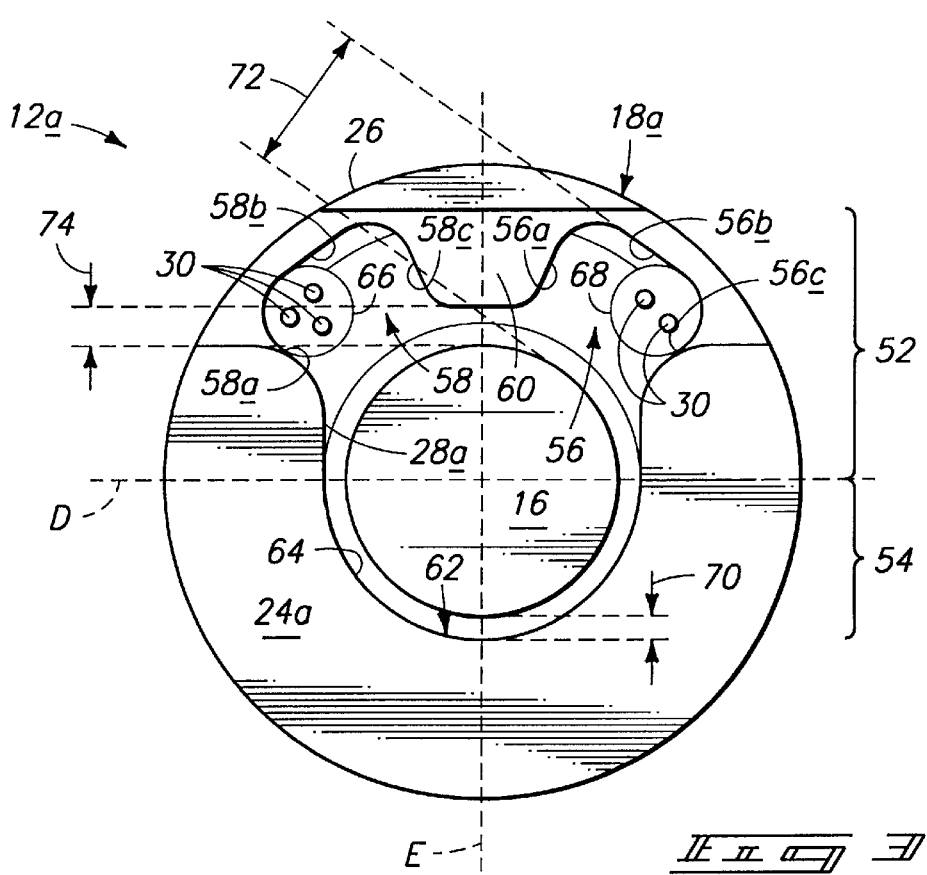
FIG. 3 is a top plan view of the FIG. 2 magnetic assembly.

In FIGS. 2 and 3, like numerals from the above-described embodiment have been utilized where appropriate, with differences being indicated with the suffix "a" or with different numerals. Accordingly, a magnetic assembly in accordance with a preferred embodiment of the present invention is set forth generally at 12a and includes a permanent magnet 16 and an excitation ring or flux concentrator 18a. Excitation ring 18a includes a base 20, an outer wall 22 joined with the base, and an upper surface 24a. The upper surface is defined between an outer edge 26 and an inner edge 28a which is spaced from the outer edge. The outer edge is preferably circular, and the inner edge defines an opening 29a into an interior region of the excitation ring. Opening 29a can be seen as comprising first and second halves which are disposed on either side of a dashed line D. In a preferred implementation, the first and second halves constitute respective top and bottom halves 52, 54 as best seen in FIG. 3, and top half 52 includes a pair of spaced-apart slots 56, 58 which are defined by inner edge 28a. Preferably, slots 56, 58 are separated by an upper surface portion or tongue 60 intermediate the slots and which extends away from outer edge 26 and toward both magnet 16 and an inner edge portion 62 which is disposed across opening 29a and away from portion 60. In the illustrated example, inner edge portion 62 is generally concentric with an adjacent portion of the outer edge.

Magnet 16 is disposed within the interior region of excitation ring 18a adjacent slots 56, 58. As can perhaps best be seen in FIG. 2, there is no excitation ring structure disposed between the magnet and either of the groupings of electrical leads 30. Hence, concerns associated with magnetic saturation due to the prior art thinned regions 50 are eliminated and a flux path is provided which redirects magnetic flux away from the areas which are disposed between electrical leads 30 and magnet 16.

In accordance with one aspect of the invention, each slot 56, 58 is defined by a plurality of walls; exemplary walls for slot 56 being shown in FIG. 3 at 56a, 56b, and 56c, and for slot 58 at 58a, 58b, and 58c. In one implementation, at least one of the slot-forming walls for an individual slot has a portion which defines an angular relationship with a next adjacent slot-forming wall portion. In the illustrated example, such angular relationship defines an angle relative to the next adjacent slot-forming wall portion which is greater than about 45 degrees, and closer to 90 degrees. For example, reference to walls 56a, 56b indicate that the individual walls define an angle which is greater than 45 degrees, and slightly less than about 90 degrees. In another implementation, each of the slot-forming walls for an individual slot defines such an angular relationship with a next-adjacent slot-forming wall. In a preferred implementation, the slots have respective shapes which are essentially the same. The slots may also be considered to have respective dimensions relative to excitation ring 18a which are essentially the same. In one aspect, slots 56, 58 are generally symmetrical about a line of symmetry E which can be seen to divide the excitation ring in half. The slots respectively extend away from magnet 16 in different directions. In a preferred implementation, magnet 16 is generally cylindrical and the slots extend radially away therefrom.

Flux concentrator 18a includes an inner wall 64 inside outer wall 22 which circumscribes both magnet 16 and at least one of electrical leads 30. In one implementation, electrical leads 30 extend into the interior region of the flux concentrator through openings 66, 68 (FIG. 3) which are preferably formed in the flux concentrator's base. The openings can, however, be formed elsewhere. In the illustrated example, the electrical leads extend through two different openings which are disposed in the base of the flux concentrator at different locations. Inner wall 64 preferably circumscribes all of the electrical leads at their respective different locations.

The illustrated inner wall 64, in its circumscribing path about magnet 16 and the illustrated electrical leads 30 is more clearly illustrated in FIG. 3 and defines a plurality of gap regions relative to magnet 16. Exemplary first, second, and third gaps regions are illustrated at 70, 72, and 74 respectively. Second gap region 72 is defined by a portion of inner wall 64 which is disposed adjacent a grouping of electrical leads 30 and away from magnet 16. The illustrated and preferred second gap region 72 is greater than first gap region 70. In the illustrated example, second gap region 72 corresponds to slot 56. Slot 58 defines a similar second gap region such that in a preferred implementation, the inner wall defines a pair of second gap regions which are separated by third gap region 74.

The above-described excitation ring or flux concentrator 18a, provides a flux path for magnetic flux developed by magnet 16. The flux path is characterized, in one implementation, by a first flux gap adjacent magnet 16 having a first width dimension. The first flux gap corresponds to first gap region 70. The flux path is also characterized, in a preferred embodiment, by a pair of spaced-apart second flux gaps having second width dimensions which are respectively greater than the first width dimension. The second flux gaps correspond to second gap region(s) 72 above. Preferably, the second flux gaps are contiguous with the first flux gap and are separated from one another by a third flux gap (corresponding to third gap region 74) having a third width dimension which is less than the respective second width dimensions. The illustrated electrical leads extend through at least one, and preferably both of the second flux gaps.

The flux concentrator enables the magnetic restoring force to be redirected for rebalancing the proof mass in a manner which reduces, if not eliminates concerns associated with magnetic flux saturation effects discussed above in connection with the prior art flux concentrator. This leads to improved scale factor performance and long term stability. Moreover, better access is provided to the electrical leads which connect the proof mass to the outside world. Hence, manufacturing activities such as bonding, potting, and cleaning are no longer blind operations. This reduces hardware failures and rework possibilities. Thus, producibility is improved and cost is reduced.

The invention has been described in compliance with the applicable statutes. Variations and modifications will be readily apparent to those of skill in the art. It is therefore to be understood that the invention is not limited to the specific features shown and described, since the disclosure comprises preferred forms of putting the invention into effect. The invention is, therefore, to be interpreted in light of the appended claims appropriately interpreted in accordance with the doctrine of equivalents.

I claim:

1. A force rebalance accelerometer magnetic assembly comprising:

an excitation ring having a base and upper surface joined with the base, the upper surface being defined between an outer edge and an inner edge spaced from the outer edge;

the inner edge defining an opening into the interior region of the excitation ring, the opening having a top half and a bottom half, the inner edge further defining a pair of spaced-apart slots in the upper surface which are disposed in the opening top half and separated by a portion of the upper surface which extends away from the outer edge and toward the inner edge portion disposed across the opening; and a magnet received within the interior region of the excitation ring proximate the spaced-apart slots and coupled with the base.

2. The assembly of claim 1, wherein the slots have respective shapes which are essentially the same.

3. The assembly of claim 1, wherein the slots have respective dimensions which are essentially the same.

4. The assembly of claim 1, wherein the slots have respective shapes and dimensions which are essentially the same.

5. The assembly of claim 1, wherein the outer edge is generally circular.

6. The assembly of claim 1, wherein the outer edge is generally circular and the inner edge portion disposed across the opening is generally concentric with the outer edge.

7. The assembly of claim 1, wherein the upper surface portion which extends away from the outer edge defines a tongue intermediate the slots which extends toward the magnet.

8. The assembly of claim 1, wherein the slots extend away from the magnet.

9. The assembly of claim 8, wherein the slots extend away from the magnet in different directions.

10. The assembly of claim 1, wherein the magnet is generally cylindrical and the slots extend radially away from the magnet.

11. The assembly of claim 10, wherein the slots extend away from the magnet in different directions.

12. A force rebalance accelerometer comprising:

a proof mass;

a mounting ring;

at least one flexure connected between the proof mass and the mounting ring;

a magnetic assembly mounted operably adjacent the proof mass and comprising a flux concentrator having a base, an outer wall joined with the base, and a magnet mounted on the base inside the outer wall; and at least one electrical lead being operably coupled with the proof mass, the at least one lead extending through an opening in the flux concentrator, the flux concentrator further comprising an inner wall inside the outer wall which circumscribes both the magnet and the at least one electrical lead, wherein the inner wall defines a first gap region, a pair of second gap regions, and a third gap region relative to the magnet which is less than the pair of second gap regions and disposed therebetween.

13. The accelerometer of claim 12, wherein the at least one electrical lead comprises at least two leads which respectively extend through the flux concentrator at different openings.

14. The accelerometer of 13, wherein the different openings are disposed in the base.

15. The accelerometer of claim 12, wherein the inner wall defines first and second gap regions relative to the magnet, the second gap region being greater than the first gap region and being defined by a portion of the inner wall proximate the at least one electrical lead and away from the magnet.

16. The accelerometer of claim 15, wherein the at least one electrical lead comprises at least two leads which respectively extend through the flux concentrator at different openings.

17. The accelerometer of claim 16, wherein the different openings are disposed in the base.

18. A force rebalance accelerometer comprising:

a proof mass configured for movement about a hinge axis;

a magnetic mounted operably proximate the proof mass;

a flux concentrator for defining a flux path for magnetic flux developed by the magnet, the flux concentrator comprising a first flux gap adjacent the magnet having a first width dimension, and a pair of spaced-apart second flux gaps contiguous with the first flux gap and having respective second width dimensions which are greater than the first width dimension.

19. The accelerometer of claim 18, wherein the second flux gaps extend away from the magnet in different directions.

20. The accelerometer of claim 18 further comprising a third flux gap intermediate the second flux gaps and contiguous therewith, the third flux gap having a third width dimension which is less than the second width dimensions.

21. The accelerometer of claim 18 further comprising an electrical lead operably connected with the proof mass and extending through one of the second flux gaps.

22. The accelerometer of claim 18 further comprising a plurality of electrical leads operably connected with the proof mass, at least one of the leads extending through one of the second flux gaps, at least another of the leads extending through the other of the second flux gaps.

23. The accelerometer of claim 22, wherein the second flux gaps extend away from the magnet in different directions.

24. A force rebalance accelerometer rebalancing method comprising:

providing a proof mass having electrically conductive structure, the proof mass being configured for movement about a hinge axis responsive to an acceleration force, and the electrically conductive structure configured to develop a restoring force responsive to the acceleration force;

providing a magnetic operably adjacent the proof mass and configured to develop magnetic flux;

providing a flux concentrator operably adjacent and connected with the magnet and configured to direct magnet flux developed by the magnet along a predetermined flux path defined at least in part by a first gap relative to the magnet having a first width dimension and a pair of spaced-apart second gaps relative to the magnet, the second gaps being contiguous with the first gap and having respective second width dimensions which are greater than the first width dimension; and responsive to an acceleration force, providing a restoring force relative to the proof mass.

25. The method of claim 24 further comprising extending an electrical lead through at least one of the second gaps, the electrical lead being operably connected with the proof mass and configured to deliver an electrical current thereto.

26. The method of claim 24 further comprising extending an electrical lead through each of the second gaps, the electrical leads being operably connected with the proof mass and configured to carry an electrical current.

27. The method of claim 24, wherein:

the second gaps extend away from the magnet in different directions; and further comprising extending an electrical lead through at least one of the second gaps, the electrical lead being operably connected with the proof mass and configured to deliver an electrical current thereto.

28. The method of claim 24, wherein:

the second gaps extend away from the magnet in different directions; and extending an electrical lead through each of the second gaps, the electrical leads being operably connected with the proof mass and configured to carry an electrical current.

* * * * *